June 14, 1927.

J. H. PARTRIDGE 1,632,500

AUTOMOBILE WHEEL

Filed Sept. 7, 1926

Inventor
J. H. Partridge
by Fetherstonhaugh & Co.
Attys.

Patented June 14, 1927.

1,632,500

UNITED STATES PATENT OFFICE.

JOHN HENRY PARTRIDGE, OF TOWN OF TRAIL, BRITISH COLUMBIA, CANADA.

AUTOMOBILE WHEEL.

Application filed September 7, 1926. Serial No. 134,088.

My invention relates to improvements in automobile wheels, and the object of the invention is to provide means for strengthening the tenon connection between the wooden spokes of an automobile wheel and the metal rim, and it consists essentially of the arrangement and construction of parts as hereinafter more particularly explained.

In the drawing like characters of reference indicate corresponding parts in each figure.

Figure 1:
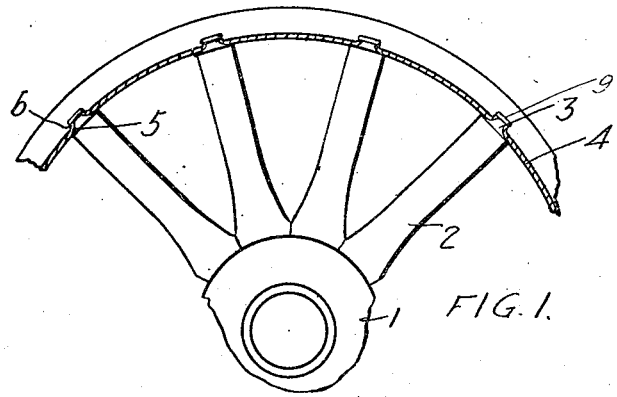
Fig. 1 is a side elevation of a fragmentary portion of an automobile wheel showing the spoke and hub portion in full elevation and the rim in section.

1 indicates the hub portion of an automobile wheel and 2 the spokes provided with a reduced upper end 3 forming a wooden tenon. 4 is a metal rim of ordinary construction provided with an orifice 5 having the edge turned up to form an annular flange portion 6 around the orifice and in which the tenon 3 fits. 7 is a tubular metal nipple preferably provided at its lower end with a serrated or toothed edge 8 to permit its being more easily driven into the wooden end of the spoke. 9 is a bead rim extending around the opposite or upper end of the nipple and into which the annular portion 6 is adapted to fit when the nipple is driven into position.

Figure 3:
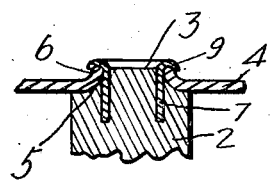
Fig. 3 is a similar view to Figure 2 showing my reinforcing means inserted therein.
Figure 4:
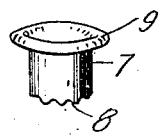
Fig. 4 is a perspective detail of the tubular nipple forming the reinforcing means.
Figure 2:
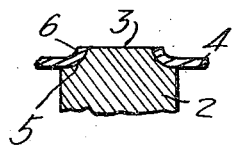
Fig. 2 is an enlarged sectional view through the tenon connection between the spoke and the metal rim as commonly employed.

In order to reinforce the tenon connection between the spoke 2 and the metal rim 3 all it is necessary to do is to place the serrated edge 8 of the tubular nipple 7 within the annular portion 6 in central alignment with the orifice 5 and drive it radially inward into the spoke end around the tenon 3 into the position shown in Figure 3 until the beaded edge 9 fits against the annular edge of the portion 6. By this means a very strong reinforced connection is formed between the wooden spoke and metal rim preventing the spoke becoming loose and obviating the necessity of frequent repair.

What I claim as my invention is:

1. In an automobile wheel, the combination with the wooden spoke having a tenoned upper end and a metal rim having an orifice into which the tenon fits, of a tubular nipple adapted to fit the orifice of the rim and to be driven radially into the spoke end around the wooden tenon within the orifice of the rim.

2. In an automobile wheel, the combination with the wooden spokes having a tenoned upper end and a metal rim having a tenon receiving orifice and having an annular flange formed around its outer edge, of a nipple adapted to be driven into the orifice and into the spoke end around the tenon and having a beaded upper edge adapted to fit over the annular flange edge of the orifice when the nipple is driven into position.

3. In an automobile wheel, the combination with a wooden spoke thereof having a tenoned upper end and a metal rim having an orifice into which the tenon fits, of a tubular nipple having a serrated lower edge adapted to fit the orifice and to be driven radially inward through the orifice into the spoke end around the tenon.

JOHN HENRY PARTRIDGE.